US012752837B2

(12) United States Patent
Beck et al.

(10) Patent No.: US 12,752,837 B2
(45) Date of Patent: Oct. 6, 2026

(54) SYSTEMS AND METHODS FOR HANDWHEEL ACTUATOR BIND AND/OR STEERING COLUMN DETECTION USING TORQUE DETECTION

(71) Applicant: STEERING SOLUTIONS IP HOLDING CORPORATION, Saginaw, MI (US)

(72) Inventors: Joseph A. Beck, Bay City, MI (US); Damian Z Gosztyla, Bay City, MI (US); James E. Rouleau, Burt, MI (US); Shawn A Haring, Swartz Creek, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 105 days.

(21) Appl. No.: 18/818,754

(22) Filed: Aug. 29, 2024

(65) Prior Publication Data

US 2025/0074501 A1 Mar. 6, 2025

Related U.S. Application Data

(60) Provisional application No. 63/580,062, filed on Sep. 1, 2023.

(51) Int. Cl.

| | |
|---|---|
| ***B62D 5/04*** | (2006.01) |
| ***B62D 1/181*** | (2006.01) |
| ***B62D 5/30*** | (2006.01) |
| ***B62D 15/02*** | (2006.01) |

(52) U.S. Cl.
CPC ........... *B62D 5/0481* (2013.01); *B62D 1/181* (2013.01); *B62D 5/0466* (2013.01); *B62D 5/30* (2013.01); *B62D 15/02* (2013.01)

(58) Field of Classification Search
None
See application file for complete search history.

(56) References Cited

U.S. PATENT DOCUMENTS

| | | | | |
|---|---|---|---|---|
| 8,521,414 | B2 * | 8/2013 | Urai | B60T 17/22 701/41 |
| 9,751,558 | B2 * | 9/2017 | Lavoie | B62D 1/04 |
| 10,421,490 | B2 * | 9/2019 | Lavoie | B62D 5/0481 |
| 10,710,629 | B2 * | 7/2020 | Morselli | B62D 1/04 |
| 11,180,191 | B2 * | 11/2021 | Xu | B62D 6/04 |
| 11,254,345 | B2 * | 2/2022 | Zheng | B62D 1/181 |

(Continued)

FOREIGN PATENT DOCUMENTS

| | | | | |
|---|---|---|---|---|
| CN | 111114615 B | * 7/2021 | | B62D 1/06 |
| CN | 115257921 A | * 11/2022 | | B62D 6/00 |

(Continued)

*Primary Examiner* — Kevin R Steckbauer
(74) *Attorney, Agent, or Firm* — Dickinson Wright PLLC

(57) ABSTRACT

A method for handwheel actuator bind and/or steering column detection includes receiving, in response to a signal indicating a change in position of power steering column, a handwheel torque signal from a sensor associated with a handwheel of a vehicle. The method also includes determining whether a torque value associated with the handwheel torque signal is greater than a threshold. The method also includes, in response to a determination that the torque value associated with the handwheel torque signal is greater than the threshold, initiating at least one countermeasure.

20 Claims, 5 Drawing Sheets

(56) References Cited

U.S. PATENT DOCUMENTS

| | | | | | |
|---|---|---|---|---|---|
| 11,325,642 | B2 * | 5/2022 | Namikawa | B62D 5/006 | |
| 11,648,980 | B2 * | 5/2023 | Otto | B60W 50/045 | 180/446 |
| 11,702,128 | B2 * | 7/2023 | Namikawa | B62D 15/029 | 701/41 |
| 11,787,468 | B2 * | 10/2023 | Trewhella | B60N 2/002 | 701/41 |
| 11,975,776 | B2 * | 5/2024 | Lee | B60R 25/0215 | |
| 12,005,902 | B2 * | 6/2024 | Diamond | B60W 30/045 | |
| 2003/0019685 | A1 * | 1/2003 | Graber | B62D 5/003 | 180/405 |
| 2005/0049769 | A1 * | 3/2005 | Tsuchiya | B62D 6/002 | 701/41 |
| 2010/0121532 | A1 * | 5/2010 | Urai | B62D 15/0265 | 701/42 |
| 2010/0211264 | A1 * | 8/2010 | Wey | B62D 6/00 | 701/41 |
| 2016/0280258 | A1 * | 9/2016 | Lavoie | B62D 5/0481 | |
| 2017/0283027 | A1 * | 10/2017 | Burk | B63H 25/24 | |
| 2018/0050724 | A1 * | 2/2018 | Morselli | B62D 1/12 | |
| 2019/0276074 | A1 * | 9/2019 | Tietz | B62D 5/006 | |
| 2020/0239061 | A1 * | 7/2020 | Zheng | B62D 5/046 | |
| 2020/0269907 | A1 * | 8/2020 | Namikawa | B62D 5/0463 | |
| 2020/0298908 | A1 * | 9/2020 | Namikawa | B62D 15/029 | |
| 2020/0339178 | A1 * | 10/2020 | Toyoda | B62D 1/19 | |
| 2021/0188349 | A1 * | 6/2021 | Xu | B62D 5/0472 | |
| 2021/0354751 | A1 * | 11/2021 | Trewhella | B60N 2/002 | |
| 2022/0144334 | A1 * | 5/2022 | Kakas | B62D 6/008 | |
| 2022/0379956 | A1 * | 12/2022 | Williams | B62D 6/007 | |
| 2023/0012253 | A1 * | 1/2023 | Lee | B60R 25/0215 | |
| 2023/0382451 | A1 * | 11/2023 | Knaub | B62D 6/002 | |
| 2025/0074501 | A1 * | 3/2025 | Beck | B62D 1/181 | |
| 2025/0187659 | A1 * | 6/2025 | Miller | B62D 6/10 | |
| 2025/0242863 | A1 * | 7/2025 | Audino Novo | B62D 15/022 | |

FOREIGN PATENT DOCUMENTS

| | | | | | |
|---|---|---|---|---|---|
| CN | 116853349 | A | * | 10/2023 | B62D 6/00 |
| CN | 115257921 | B | * | 7/2024 | B62D 5/0463 |
| CN | 119551069 | A | * | 3/2025 | B62D 5/30 |
| DE | 10261001 | A1 | * | 7/2004 | B62D 5/0466 |
| DE | 102014016017 | A1 | * | 5/2016 | B60R 25/02 |
| DE | 102021112323 | A1 | * | 11/2021 | B60N 2/002 |
| DE | 102021124485 | A1 | * | 1/2023 | B62D 6/008 |
| DE | 102023113684 | A1 | * | 11/2023 | B62D 13/06 |
| DE | 102023123747 | A1 | * | 3/2025 | B62D 6/008 |
| DE | 102024124841 | A1 | * | 3/2025 | B62D 5/30 |
| DE | 102021124485 | B4 | * | 4/2025 | B62D 5/006 |
| EP | 3712036 | A1 | * | 9/2020 | B62D 5/046 |
| EP | 3712036 | B1 | * | 4/2023 | B62D 5/046 |
| EP | 4559783 | A1 | * | 5/2025 | B62D 5/0481 |
| EP | 4147946 | B1 | * | 12/2025 | B62D 5/0469 |
| FR | 2997367 | A1 | * | 5/2014 | B62D 5/0469 |
| JP | 2682564 | B2 | * | 11/1997 | B62D 5/0481 |
| JP | 2003154950 | A | * | 5/2003 | |
| JP | 5262005 | B2 | * | 8/2013 | B62D 5/0466 |
| JP | 2025080772 | A | * | 5/2025 | B62D 15/0235 |
| WO | WO-2025051808 | A1 | * | 3/2025 | B62D 6/008 |

* cited by examiner

SYSTEMS AND METHODS FOR HANDWHEEL ACTUATOR BIND AND/OR STEERING COLUMN DETECTION USING TORQUE DETECTION

CROSS-REFERENCES TO RELATED APPLICATIONS

This patent application claims priority to U.S. Provisional Patent Application No. 63/580,062, filed Sep. 1, 2023 which is incorporated herein by reference in its entirety.

TECHNICAL FIELD

This disclosure relates to steering systems, and in particular to systems and methods for handwheel actuator bind and/or steering column detection using torque detection.

BACKGROUND

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

SUMMARY

This disclosure relates generally to steering systems.

An aspect of the disclosed embodiments includes a method for handwheel actuator bind and/or steering column detection. The method includes receiving, in response to a signal indicating a change in position of power steering column, a handwheel torque signal from a sensor associated with a handwheel of a vehicle. The method also includes determining whether a torque value associated with the handwheel torque signal is greater than a threshold. The method also includes, in response to a determination that the torque value associated with the handwheel torque signal is greater than the threshold, initiating at least one countermeasure.

Another aspect of the disclosed embodiments includes a system for handwheel actuator bind and/or steering column detection. The system includes a processor, and a memory. The memory includes instructions that, when executed by the processor, cause the processor to: receive, in response to a signal indicating a change in position of power steering column, a handwheel torque signal from a sensor associated with a handwheel of a vehicle; determine whether a torque value associated with the handwheel torque signal is greater than a threshold; and, in response to a determination that the torque value associated with the handwheel torque signal is greater than the threshold, initiate at least one countermeasure.

Another aspect of the disclosed embodiments includes an apparatus for handwheel actuator bind and/or steering column detection. The apparatus includes a controller configured to: receive, in response to a signal indicating a change in position of power steering column of a steer-by-wire steering system, a handwheel torque signal from a sensor associated with a handwheel of a vehicle; determine whether a torque value associated with the handwheel torque signal is greater than a threshold indicating that the power steering column encountered an obstacle; and, in response to a determination that the torque value associated with the handwheel torque signal is greater than the threshold, initiate at least one countermeasure.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
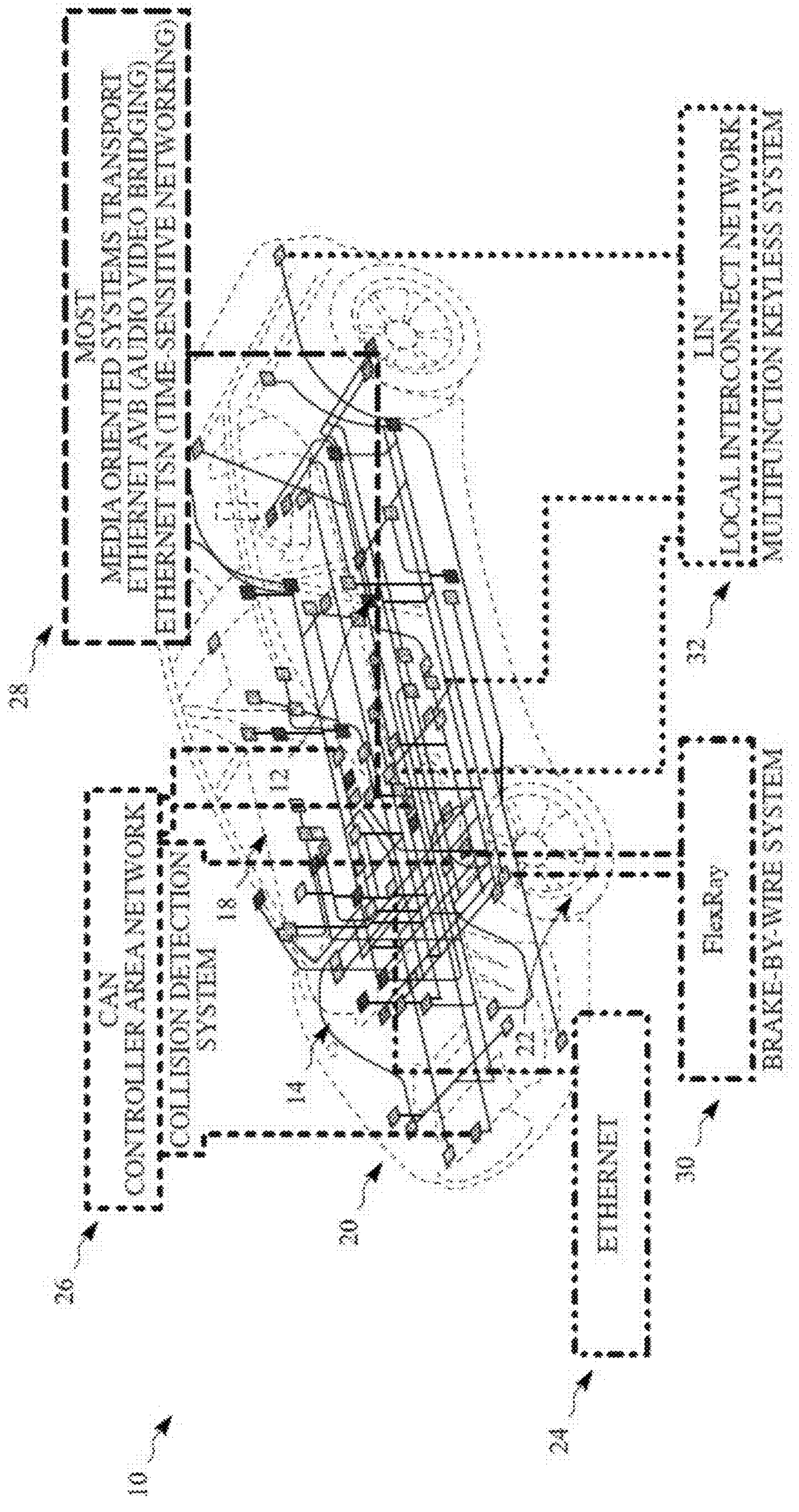
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

Such vehicles, as described, include a steering system that includes a handwheel and power adjustable steering column. Increasingly, such steering columns include power steering columns configured to be positioned in a driving position, stowed position, and/or other suitable position. Additional, or alternatively, the handwheel and/or power steering column may be selectively adjustable (e.g., including position) while in use and/or while stowed.

As such handwheels and power steering columns are positionable, they are susceptible to pinch, binding, and the like. For example, an obstacle, such as a hand, knee, or other suitable obstacle, may be in the path of the handwheel and/or power steering column during positioning, and may make contact with the handwheel and/or power steering column.

Typically, pinch detection systems rely on a feedback loop of current monitoring of a handwheel actuator. When the monitored current level to the actuator increases, the data is interpreted and communicated to a control module to stop the actuator (e.g., or associated motor) or stop and reverse direction of motion of the actuator (e.g., using the associated motor). However, such systems may be relatively slow to communicate the data, which may delay stopping the motion of the actuator (e.g., or associated motor) and/or to change direction of the actuator (e.g., or associated motor) before a detrimental condition occurs. Additionally, such systems may be sensitive to noise, such as grease causing a stick slip condition in a relatively cold environment, which may trigger a false positive (e.g., identified as a pinch or bind condition when no pinch or bind condition is present).

Accordingly, systems and methods, such as those described herein, configured to provide handwheel actuator pitch and/or bind detection using torque detection, may be desirable. In some embodiments, the systems and methods described herein may be configured to use a sensor (e.g., which may include a motion sensor a force sensor, a rotation sensor, a torque sensor, any other suitable sensor, or a combination thereof) and associated sensor data associated with the handwheel of a steering system of a vehicle.

In some embodiments, the systems and methods described herein may be configured to, when an obstacle is encountered, detect movement (e.g., rotation or other suitable movement) of the steering column associated with the handwheel caused by contact between the handwheel and an obstruction or obstacle, which is measured by the sensor associated with the handwheel. The systems and methods described herein may be configured to, responsive to detecting motion of the steering column, trigger the column actuator of the steering column to perform a unique countermeasure, which may include reversing direction, stopping movement, returning to a start position, issuing a warning, any other suitable countermeasure, or any combination thereof.

In some embodiments, the systems and methods described herein may be configured to detect an obstacle in the path of the handwheel and/or steering column during a telescope movement, rake movement, tilt movement, and the like of the steering column using measured movement of the handwheel. The systems and method described herein may be configured to detect movement of the handwheel caused by any contact with an obstacle, which causes the handwheel to twitch or move. The systems and method described herein may be configured to reverse the motor associated with the actuator of the steering column, responsive to detecting the handwheel movement.

In some embodiments, the systems and methods described herein may be configured to provide handwheel actuator and/or steering column bind detection. The systems and method described herein may be configured to receive, in response to a signal indicating a change in position of a power steering column, a handwheel torque signal from a sensor associated with a handwheel of a vehicle. The systems and method described herein may be configured to determine whether a torque value associated with the handwheel torque signal is greater than a threshold. The systems and method described herein may be configured to, in response to a determination that the torque value associated with the handwheel torque signal is greater than the threshold, initiate at least one countermeasure. The countermeasure may include reversing direction of the power steering column, halting movement of the power steering column, returning the power steering column to a starting position, providing an indication, any other suitable countermeasure, or any combination thereof.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by an operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
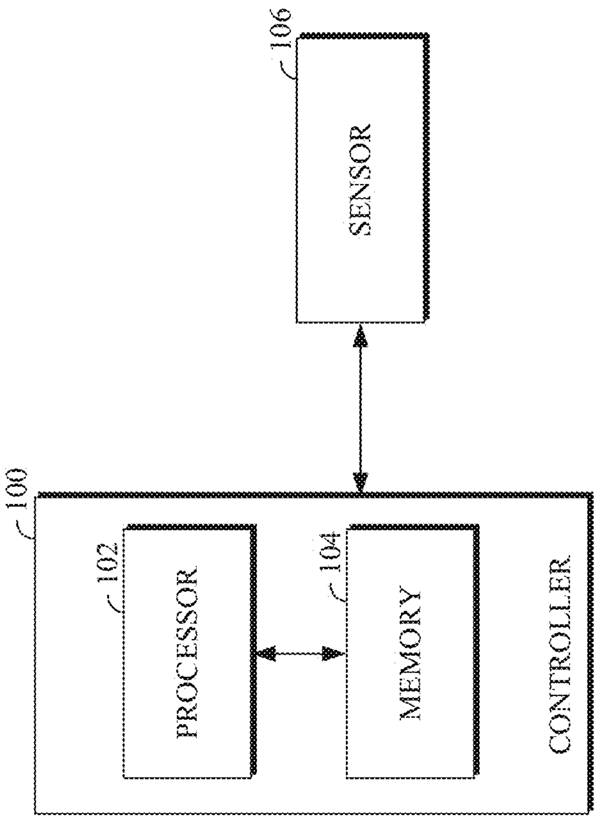
FIG. 2 generally illustrates a controller according to the principles of the present disclosure.
Figure 3:
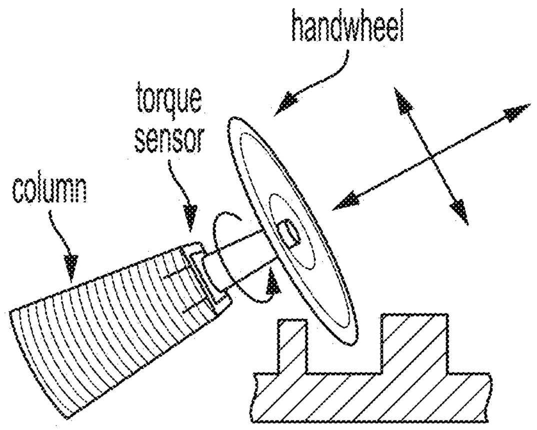
FIG. 3 generally illustrates a steering column and handwheel according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, one or more radar sensors or devices, one or more lidar sensors or devices, one or more sonar sensors or devices, one or more image capturing sensors or devices, other suitable sensors or devices, or a combination thereof. The one or more signals may indicate a handwheel torque, a handwheel angle, a motor velocity, a vehicle speed, other suitable information, or a combination thereof.

In some embodiments, the controller 100 may be configured to provide handwheel actuator and/or steering column bind detection. The controller 100 may receive, in response to a signal indicating a change in position of the power steering column, a handwheel torque signal from a sensor 106 associated with the handwheel of the vehicle 10. The controller 100 may determine whether a torque value associated with the handwheel torque signal is greater than a threshold. The controller 100 may, in response to a determination that the torque value associated with the handwheel torque signal is greater than the threshold, initiate at least one countermeasure. The countermeasure may include reversing direction of the power steering column, halting movement of the power steering column, returning the power steering column to a starting position, providing an indication, any other suitable countermeasure, or any combination thereof.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 4:
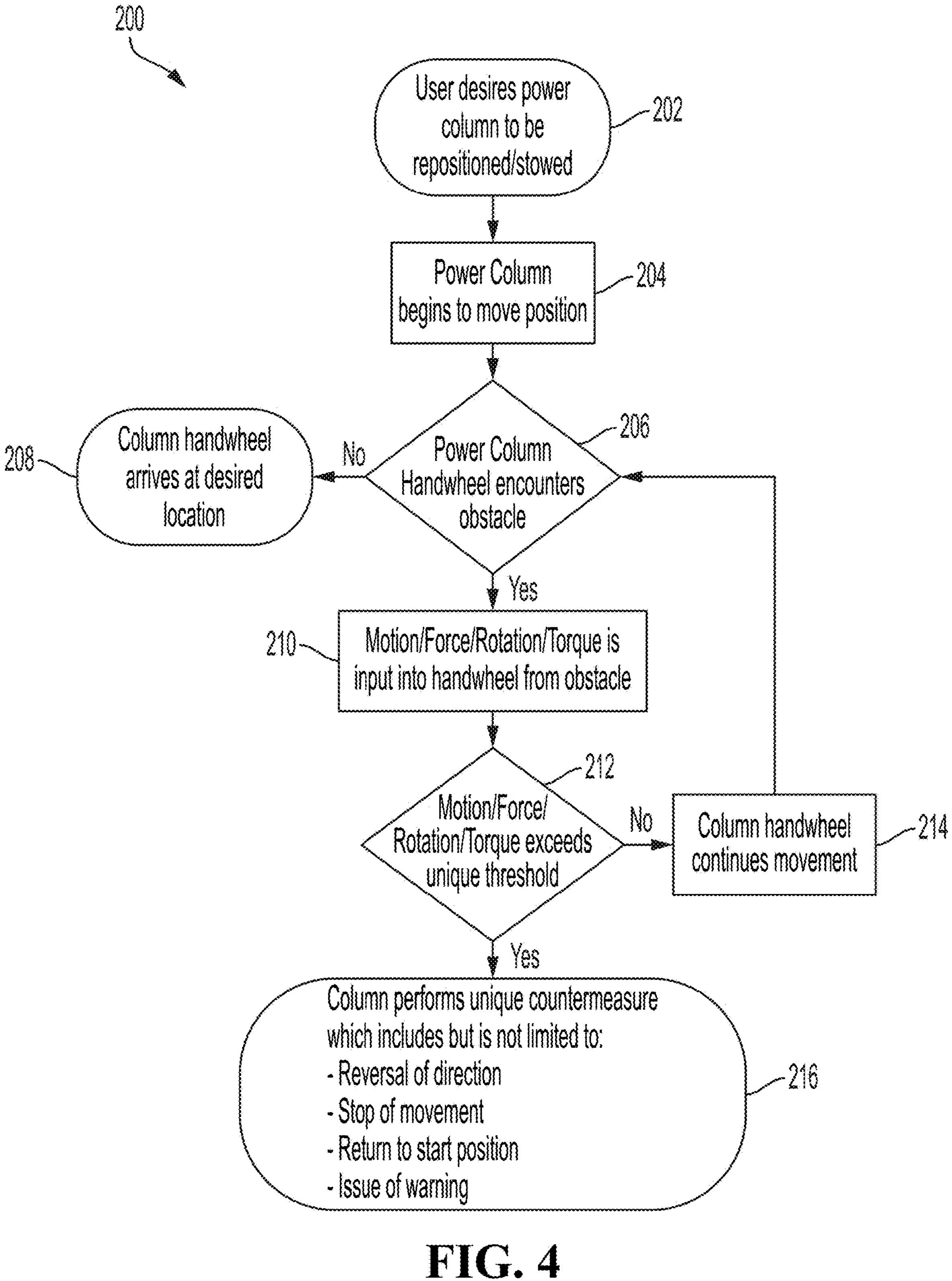
FIG. 4 is a flow diagram generally illustrating a handwheel actuator bind and/or steering column detection method according to the principles of the present disclosure.

FIG. 4 is a flow diagram generally illustrating a handwheel actuator bind and/or steering column detection method management method 200 according to the principles of the present disclosure. At 202, the method 200 receives an indication that the user desire the power steering column to be repositioned and/or stowed. For example, the controller 100 may receive the indication that the user desires the power steering column to be repositioned and/or stowed.

At 204, the method 200 causes the power steering column to move. For example, the controller 100 or other suitable controller of the vehicle 10 may cause the power steering column to move.

At 206, the method 200 determines whether a handwheel associated with the power steering column encounters an obstacle. For example, the controller 100 determines whether the handwheel encounters an obstacle. If the controller 100 determines that the handwheel encountered an obstacle, the method 200 continues at 210. Alternatively, if the controller 100 determines that the handwheel did not encounter an obstacle, the method 200 continues at 208.

At 208, the method 200 allows the power steering column and/or handwheel to arrive at the desired location. For example, the controller 100 may control actuation of the power steering column and/or handwheel to allow the power steering column and/or handwheel to arrive at the desired location.

At 210, the method 200 receives sensor data from a sensor associated with the handwheel indicating at least one of motion, force, rotation, and/or torque of the handwheel responsive to the handwheel making contact with an obstacle. For example, the controller 100 may receive the sensor data from the sensor 106 associated with the handwheel.

At 212, the method 200 determines whether the sensor data indicates a value of the sensor data (e.g., indicating motion, force, rotation and/or torque) is greater than a threshold. For example, the controller 100 may determine whether the value is greater than the threshold. If the controller 100 determines that the value is greater than the threshold, the method 200 continues at 216. Alternatively, if the controller 100 determines that the value is not greater than the threshold, the method 200 continues at 214.

At 214, the method 200 allows the power steering column and/or handwheel to continue to move. The method 200 continues at 206.

At 216, the method 200 performs a countermeasure on the power steering column and/or handwheel that includes at least one of reversing direction, stopping movement, returning to a starting position, issuing a warning, any other suitable countermeasure, and/or a combination thereof. For example, the controller 100 may perform the countermeasure.

Figure 5:
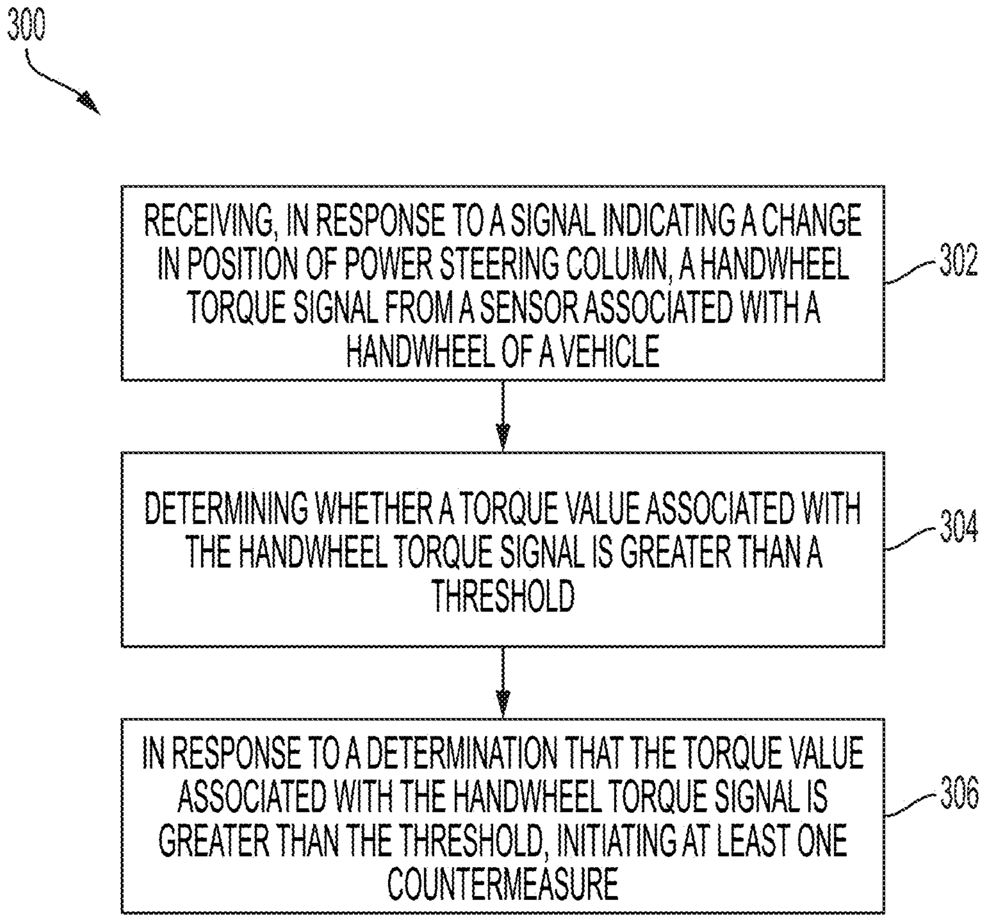
FIG. 5 is a flow diagram generally illustrating an alternative handwheel actuator bind and/or steering column detection method according to the principles of the present disclosure.

FIG. 5 is a flow diagram generally illustrating an alternative handwheel actuator bind and/or steering column detection method management method 300 according to the principles of the present disclosure. At 302, the method 300 receives, in response to a signal indicating a change in position of power steering column, a handwheel torque signal from a sensor associated with a handwheel of a vehicle. For example, the controller 100 may receive, in response to the signal indicating the change in position of the power steering column, a handwheel torque signal from the sensor 106 associated with the handwheel of the vehicle 10.

At 304, the method 300 determines whether a torque value associated with the handwheel torque signal is greater than a threshold. For example, the controller 100 may determine whether the torque value associated with the handwheel torque signal is greater than the threshold.

At 306, the method 300, in response to a determination that the torque value associated with the handwheel torque signal is greater than the threshold, initiates at least one countermeasure. For example, the controller 100, in response to the determination that the torque value associated with the handwheel torque signal is greater than the threshold, initiates the at least one countermeasure.

In some embodiments, a method for handwheel actuator bind and/or steering column detection includes receiving, in response to a signal indicating a change in position of power steering column, a handwheel torque signal from a sensor associated with a handwheel of a vehicle. The method also includes determining whether a torque value associated with the handwheel torque signal is greater than a threshold. The method also includes, in response to a determination that the torque value associated with the handwheel torque signal is greater than the threshold, initiating at least one countermeasure.

In some embodiments, the handwheel is associated with a steering system of a vehicle. In some embodiments, the steering system includes an electronic power steering system. In some embodiments, the steering system includes a steer-by-wire steering system. In some embodiments, the steering system includes a hydraulic steering system. In some embodiments, the at least one countermeasure includes reversing direction of the power steering column. In some embodiments, the at least one countermeasure includes halting movement of the power steering column. In some embodiments, the at least one countermeasure includes returning the power steering column to a starting position. In some embodiments, the at least one countermeasure includes providing an indication.

In some embodiments, a system for handwheel actuator bind and/or steering column detection includes a processor, and a memory. The memory includes instructions that, when executed by the processor, cause the processor to: receive, in response to a signal indicating a change in position of power steering column, a handwheel torque signal from a sensor associated with a handwheel of a vehicle; determine whether a torque value associated with the handwheel torque signal is greater than a threshold; and, in response to a determination that the torque value associated with the handwheel torque signal is greater than the threshold, initiate at least one countermeasure.

In some embodiments, the handwheel is associated with a steering system of a vehicle. In some embodiments, the steering system includes an electronic power steering system. In some embodiments, the steering system includes a steer-by-wire steering system. In some embodiments, the steering system includes a hydraulic steering system. In some embodiments, the at least one countermeasure includes reversing direction of the power steering column. In some embodiments, the at least one countermeasure includes halting movement of the power steering column. In some embodiments, the at least one countermeasure includes returning the power steering column to a starting position. In some embodiments, the at least one countermeasure includes providing an indication.

In some embodiments, an apparatus for handwheel actuator bind and/or steering column detection includes a controller configured to: receive, in response to a signal indicating a change in position of power steering column of a steer-by-wire steering system, a handwheel torque signal from a sensor associated with a handwheel of a vehicle; determine whether a torque value associated with the handwheel torque signal is greater than a threshold indicating that the power steering column encountered an obstacle; and, in response to a determination that the torque value associated with the handwheel torque signal is greater than the threshold, initiate at least one countermeasure.

In some embodiments, the at least one countermeasure includes halting movement of the power steering column.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for handwheel actuator bind and/or steering column detection, the method comprising:

receiving a handwheel torque signal from a sensor associated with a handwheel of a vehicle, in response to a signal indicating a change in position of power steering column associated with one of a telescoping movement of the power steering column, a raking movement of the power steering column, and a tilting movement of the power steering column;

determining whether a torque value associated with the handwheel torque signal is greater than a threshold; and in response to a determination that the torque value associated with the handwheel torque signal is greater than the threshold, initiating at least one countermeasure.

2. The method of claim 1, wherein the handwheel is associated with a steering system of a vehicle.

3. The method of claim 2, wherein the steering system includes an electronic power steering system.

4. The method of claim 2, wherein the steering system includes a steer-by-wire steering system.

5. The method of claim 2, wherein the steering system includes a hydraulic steering system.

6. The method of claim 1, wherein the at least one countermeasure includes reversing direction of the power steering column.

7. The method of claim 1, wherein the at least one countermeasure includes halting movement of the power steering column.

8. The method of claim 1, wherein the at least one countermeasure includes returning the power steering column to a starting position.

9. The method of claim 1, wherein the at least one countermeasure includes providing an indication.

10. A system for handwheel actuator bind and/or steering column detection, the system comprising:

a processor; and a memory including instructions that, when executed by the processor, cause the processor to:

receive a handwheel torque signal from a sensor associated with a handwheel of a vehicle, in response to a signal indicating a change in position of power steering column associated with one of a telescoping movement of the power steering column, a making movement of the power steering column, and a tilting movement of the power steering column;

determine whether a torque value associated with the handwheel torque signal is greater than a threshold; and in response to a determination that the torque value associated with the handwheel torque signal is greater than the threshold, initiate at least one countermeasure.

11. The system of claim 10, wherein the handwheel is associated with a steering system of a vehicle.

12. The system of claim 11, wherein the steering system includes an electronic power steering system.

13. The system of claim 11, wherein the steering system includes a steer-by-wire steering system.

14. The system of claim 11, wherein the steering system includes a hydraulic steering system.

15. The system of claim 10, wherein the at least one countermeasure includes reversing direction of the power steering column.

16. The system of claim 10, wherein the at least one countermeasure includes halting movement of the power steering column.

17. The system of claim 10, wherein the at least one countermeasure includes returning the power steering column to a starting position.

18. The system of claim 10, wherein the at least one countermeasure includes providing an indication.

19. An apparatus for handwheel actuator bind and/or steering column detection, the apparatus comprising:

a controller configured to:

receive a handwheel torque signal from a sensor associated with a handwheel of a vehicle, in response to a signal indicating a change in position of power steering column of a steer-by-wire steering system, wherein the change in position of the power steering column is associated with one of a telescoping movement of the power steering column, a raking movement of the power steering column, and a tilting movement of the power steering column;

determine whether a torque value associated with the handwheel torque signal is greater than a threshold indicating that the power steering column encountered an obstacle; and in response to a determination that the torque value associated with the handwheel torque signal is greater than the threshold, initiate at least one countermeasure.

20. The apparatus of claim 19, wherein the at least one countermeasure includes halting movement of the power steering column.

* * * * *